US008898658B2

(12) United States Patent
Ciccone (10) Patent No.: US 8,898,658 B2
(45) Date of Patent: Nov. 25, 2014

(54) DYNAMIC WEB RESOURCE PROVISIONING (75) Inventor: Michael Anthony Ciccone, Boxborough, MA (US)

(73) Assignee: Cisco Technology, Inc., San Jose, CA (US)

( * ) Notice: Subject to any disclaimer, the term of this patent is extended or adjusted under 35 U.S.C. 154(b) by 561 days.

(21) Appl. No.: 12/826,229

(22) Filed: Jun. 29, 2010

(65) Prior Publication Data
US 2011/0321032 A1 Dec. 29, 2011

(51) Int. Cl.
*G06F 9/44* (2006.01)
*G06F 9/45* (2006.01)
*G06F 13/00* (2006.01)
*G06F 9/445* (2006.01)

(52) U.S. Cl.
CPC . *G06F 9/445* (2013.01); *G06F 8/65* (2013.01)
USPC ........... 717/173; 717/168; 717/171; 717/172; 717/174; 719/313; 719/328

(58) Field of Classification Search
None
See application file for complete search history.

(56) References Cited

U.S. PATENT DOCUMENTS

| | | | | |
|---|---|---|---|---|
| 6,154,878 | A * | 11/2000 | Saboff | 717/173 |
| 6,678,887 | B1 * | 1/2004 | Hallman et al. | 717/162 |
| 7,188,163 | B2 * | 3/2007 | Srinivasan et al. | 709/221 |
| 7,698,685 | B2 * | 4/2010 | Pepin et al. | 717/120 |
| 7,818,759 | B2 * | 10/2010 | Ahmed et al. | 719/330 |
| 7,930,692 | B2 * | 4/2011 | Compas et al. | 717/171 |
| 8,122,444 | B2 * | 2/2012 | Grechanik et al. | 717/168 |
| 8,127,284 | B2 * | 2/2012 | Meijer et al. | 717/166 |
| 8,245,218 | B2 * | 8/2012 | Giambalvo et al. | 717/172 |
| 2004/0003266 | A1 * | 1/2004 | Moshir et al. | 713/191 |
| 2005/0138648 | A1 * | 6/2005 | Ahmed et al. | 719/328 |
| 2005/0172281 | A1 * | 8/2005 | Goring et al. | 717/174 |
| 2009/0037896 | A1 * | 2/2009 | Grechanik et al. | 717/168 |
| 2009/0077566 | A1 * | 3/2009 | Childress et al. | 719/313 |
| 2009/0125919 | A1 * | 5/2009 | Meijer et al. | 719/328 |
| 2009/0187573 | A1 * | 7/2009 | Johnston et al. | 707/10 |
| 2009/0199218 | A1 * | 8/2009 | Goring et al. | 719/328 |
| 2009/0300595 | A1 * | 12/2009 | Moran et al. | 717/170 |
| 2009/0300601 | A1 * | 12/2009 | Faus et al. | 717/176 |
| 2010/0088693 | A1 * | 4/2010 | Vulugundam | 717/173 |
| 2011/0047535 | A1 * | 2/2011 | Polakam et al. | 717/168 |
| 2011/0047537 | A1 * | 2/2011 | Yu et al. | 717/173 |

OTHER PUBLICATIONS

Comparing jMock and Dynamock, Apr. 16, 2007, 3 pages, [retrieved on May 23, 2013], Retrieved from the Internet: <URL:http://web.archive.org/web/20070416214710/http://jmock.codehaus.org/dynamock-comparison.html>.*

Mössenböck, H., Extensibility in the Oberon System, Nordic Journal of Computing, 1994, pp. 77-93, [retrieved on 3/7/14], Retrieved from the Internet: <URL:http://citeseerx.ist.psu.edu/viewdoc/summary?doi=10.1.1.103.8213>.*

(Continued)

*Primary Examiner* — Thuy Dao
*Assistant Examiner* — Geoffrey St Leger
(74) *Attorney, Agent, or Firm* — Brinks Gilson & Lione (57) ABSTRACT

In one embodiment, Dynamic Web Resource Provisioning (DWRP) is a web services based mechanism for dynamic web services application programming interface (API) extensibility. A director network device provisions one or more agent network devices with a message in the form of a POST request to a first API. The message includes instruction configured to extend a second API in the agent network device. The director network device delivers dynamic language code to the second API by way of a PUT request.

19 Claims, 6 Drawing Sheets

(56) References Cited

OTHER PUBLICATIONS

Mietzner, R., et al., Towards Provisioning the Cloud: On the Usage of Multi-Granularity Flows and Services to Realize a Unified Provisioning Infrastructure for SaaS Applications, IEEE Congress on Services, 2008, pp. 3-10, [retrieved on Jul. 23, 2014], Retrieved from the Internet: <URL:http://ieeexplore.ieee.org/>.*

Roy Thomas Fielding, *Architectural Styles and the Design of Network-based Software Architectures,* Chapter 5, 2000, via http://www.ics.uci.edu/~fielding/pubs/dissertation/rest_arch_style.htm last accessed Jun. 28, 2010.

Cesare Pautasso, *Composing REST Services—Open Dagstuhl Session,* Jan. 2009 via http://www.dagstuhl.de/Materials/Files/09/09021/09021.PautassoCesare.Slides.pdf accessed Jun. 28, 2010.

Greg Stein, "mod_dav Frequently Asked Questions," dated Nov. 2001, via http://www.webdav.org/mod_dav/faq/ accessed Jun. 28, 2010.

* cited by examiner

DYNAMIC WEB RESOURCE PROVISIONING

TECHNICAL FIELD

The present embodiments generally relate to web resources and web services.

BACKGROUND

Web services include application programming interfaces (API) accessed over a network by another system. Two popular implementations of web services include representational state transfer (REST) and simple object access protocol (SOAP). In both systems, servers process requests and return responses. A web resource may be referenced using a uniform resource identifier (URI) obtainable over hypertext transfer protocol (HTTP).

Web services must be upgraded when their functionality no longer meets the requirements of the user. Generally when a new version is required, the entire web service must be wholesale changed to the new version. Naturally, the web service cannot be replaced when the web service is running, resulting in system down time.

DESCRIPTION

Overview

Conventional web services may be modified or extended by a complete replacement of the software infrastructure. Dynamic Web Resource Provisioning (DWRP) modifies or extends web services on the fly. DWRP first provisions the system with a web services application programming interface (API) extension. The API extension may equip the system with new resource definitions, API contracts, and dynamic language code to enable new web services functionality.

In a first aspect, a method includes sending a message to a first application programming interface (API) of at least one agent network device, wherein the message includes instructions configured to extend a second API in the at least one agent network device; and delivering dynamic language code to the second API, wherein the dynamic language code defines a contract with the at least one agent network device.

In a second aspect, an apparatus includes a first application programming interface (API), a second API, and an execution engine. The first API is configured to receive a message from a network device. The second API is extended by instructions in the message and configured to receive dynamic language code from the network device. The execution engine is configured to execute the code received from the network device according to a contract between the network device and the apparatus.

Example Embodiments

DWRP permits modification of web services on the fly. The web services are stored on one or more agent network devices that receive requests from a director network device. The director network device first provisions the agent with a web services application programming interface (API) extension. The API extension equips the system with new resource definitions, API contracts, and dynamic language code to enable new web services functionality. The "agent" and "director" labels are merely placeholders. The agent network devices may be considered agents because they receive requests from the director network device. Along the same lines, the director network device may be considered a director in the sense in sends requests to the agent network devices.

Figure 1:
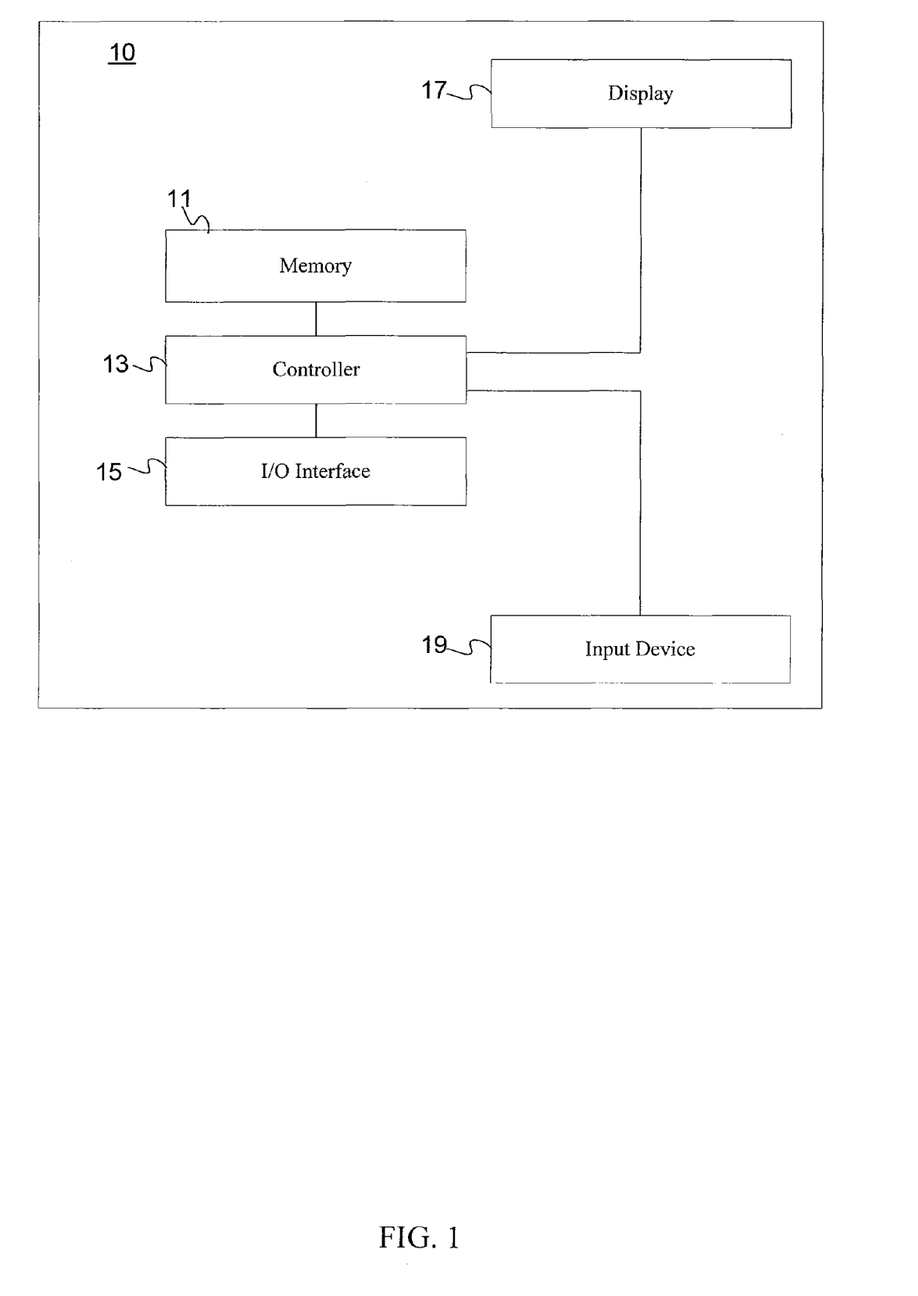
FIG. 1 illustrates one embodiment of a director network device.

FIG. 1 illustrates one embodiment of a director network device 10. The director network device 10 includes a memory 11, a controller 13, an I/O interface 15, a display 17, and an input device 19. The director network device 10 may be a server configured to run a web application (web service) using the controller 13. The web application may be stored in memory 11. The director network device 10 communicates with one or more agents using the I/O interface 15. Additional, different, or fewer components may be provided.

Figure 2:
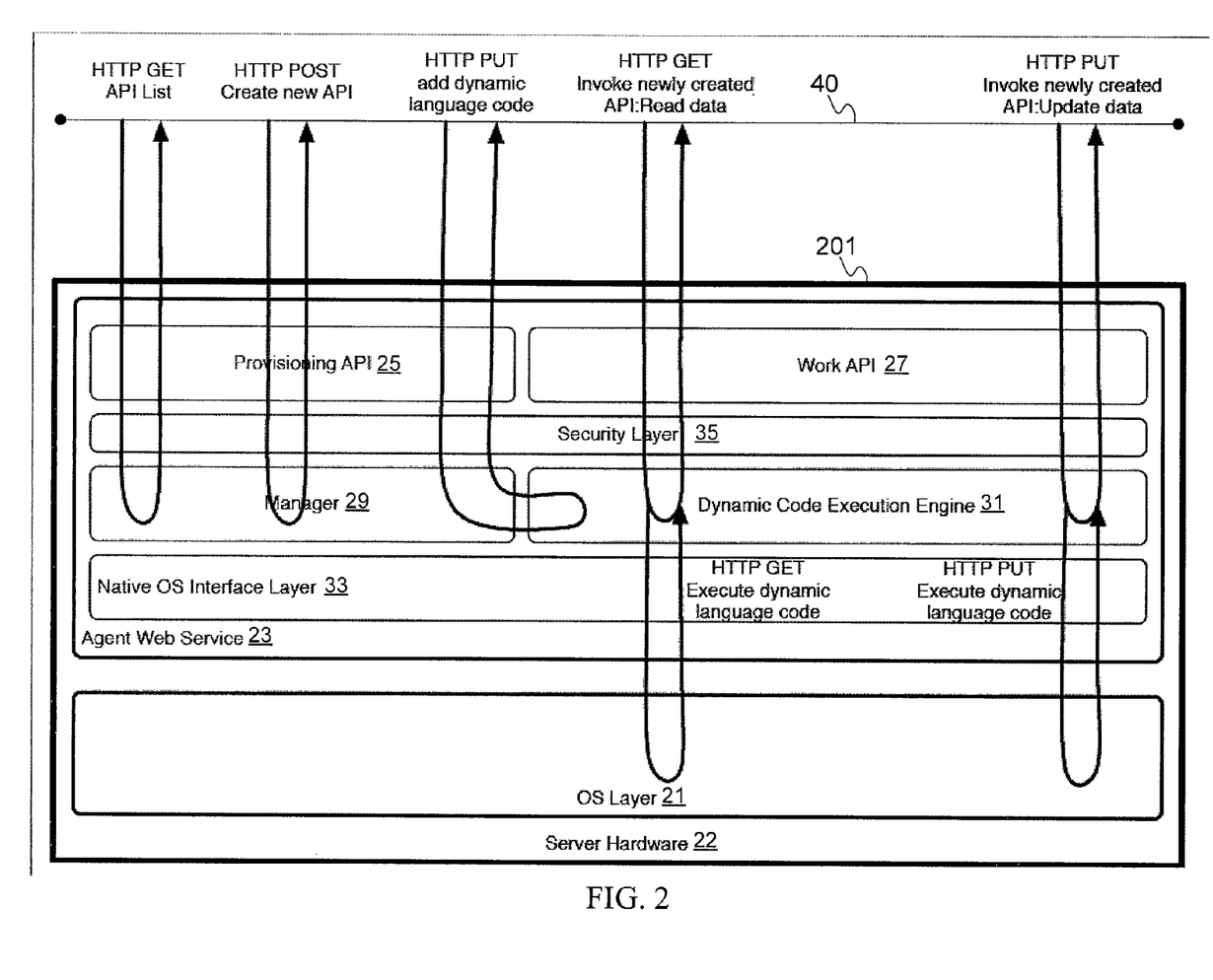
FIG. 2 illustrates one embodiment of an agent network device.

FIG. 2 illustrates one embodiment of an agent network device 201, which may be a server. The agent network device 201 includes operating system (OS) layer 21 and server hardware 22. The server hardware 22 may include the same components discussed above with respect to director network device 10. The agent network device 201 also includes an agent web service 23. In one implementation, agent web service 23 includes a provisioning API 25, a work API 27, a manager 29, a dynamic code execution engine 31, a native operating system (OS) interface layer 33, and a security layer 35.

In FIG. 2, a command sequence line 40 illustrates the interaction between director network device 10 and agent network device 201. The director network device 10 may execute a series of workflows over a REST architecture and the following description will be discussed in terms of hypertext transfer protocol (HTTP), however other implementation outside of both HTTP and REST are possible. HTTP defines the following six operations: GET, PUT, POST, DELETE, HEAD, and OPTIONS.

First, the director network device 10 may issue a message in the form of a GET request to the provisioning API 25 of the agent network device 201. The agent network device 201 responds with a list of the web resources currently supported by the agent network device 201. The director network device 10 may compare a potential new web resource for agent network device 201 against the list of the web resources. The list of web resources may be in the form of uniform resource identifiers (URIs).

Next, the director network device 10 may issue a message in the form of a POST request to the provisioning API 25 of the agent network device 201 in order to add new web resources to the work API 27. The manager 29 includes instructions or logic configured to control the provisioning of the new web resources to work API 27. The POST request may include XML code. An example XML code may include:

```
<region name = "Region1">
    <device name="Device1">
        <resource name="sample1">
            <method>GET</method>
        </resource>
        <resource name="sample1/state">
            <method>GET</method>
            <method>PUT</method>
        </resource>
    </device>
</region>
```

The above example XML code adds two web resources to work API 27. The first, sample1, accepts HTTP GET requests. The second, sample1/state, accepts both GET and PUT requests. The work API 27 has been extended with two web resources by instructions in the POST request from director network device 10.

Next, the director network device 10 sends an HTTP PUT request to agent network device 201 via provisioning API 25. The HTTP PUT request delivers dynamic language code to the agent network device 201 using the web resource previously added to the work API 27. For example, the web resource may be the sample1/state web resource. Dynamic language code executes at least one aspect of the program that would typically be executed at compilation. For example, dynamic language code may extend the program itself by adding new objects and definitions during execution of the program. The dynamic language code delivers the methods, parameters, code and error handling that make up an execution contract between the network device 10 and the agent network device 201 for the two new web resources. Parameters may be referred to as arguments.

The dynamic language code may be delivered as text within an XML payload of the HTTP put request. The dynamic code provides all of the definitions necessary for agent network device 201 to respond to future work API 27 requests such as an HTTP GET requests on the new web resource. The dynamic language code may be written in languages such as PowerShell, Ruby, Python, or other languages.

Finally, the network device 10 initiates execution of the code according the execution contract by sending an HTTP GET request and an HTTP PUT request to the agent network device 201 via the work API 27. Specifically, the HTTP GET request reads data from the dynamic code execution engine 31 by invoking one of the newly created web resources and the HTTP PUT request updates data by invoking the other newly created web resource. The agent network device 201 passes any parameters to the dynamic language code and executes the dynamic language code and returns data to network device 10.

The native OS interface layer 33 includes the interfaces provided by the OS for interaction with agent web services 23. The operating system may be Microsoft Windows Server based, Linux based, or based on another operating system. The security layer 35 enforces the security policies the agent network device 201.

Referring back to FIG. 1, the display 17 is configured to display status information received from one or more agents at the director network device 10. The display 17 may be a cathode ray tube (CRT) monitor, a liquid crystal display (LCD) panel, or another type of display.

The input device 19 allows a user or administrator to input commands to the director network device 10. The input device 19 may be a keyboard, trackball, touch pad, a mouse, or other user input. Alternatively, the input device 19 and/or the display 17 may be provided remotely at another terminal by way of a network or the Internet.

The memory 11 may be a volatile memory or a non-volatile memory. The memory 11 may include one or more of a read only memory (ROM), dynamic random access memory (DRAM), a static random access memory (SRAM), a programmable random access memory (PROM), a flash memory, an electronic erasable program read only memory (EEPROM), static random access memory (RAM), or other type of memory. The memory 11 may include an optical, magnetic (hard drive) or any other form of data storage device. The memory 11 may be located in a remote device or removable, such as a secure digital (SD) memory card.

The memory 11 may store computer executable instructions. The controller 13 may execute computer executable instructions. The computer executable instructions may be included in computer code. The computer code may be stored in the memory 11. The computer code may be written in any computer language, such as PowerShell, Ruby, Python, C++, C#, Java, Pascal, Visual Basic, Perl, HyperText Markup Language (HTML), JavaScript, assembly language, extensible markup language (XML) and any combination thereof.

The computer code may be logic encoded in one or more tangible media or one or more non-transitory tangible media for execution by the controller 13. Logic encoded in one or more tangible media for execution may be defined as instructions that are executable by the controller 13 and that are provided on the computer-readable storage media, memories, or a combination thereof. Instructions for instructing a network device may be stored on any logic. As used herein, "logic", includes but is not limited to hardware, firmware, software in execution on a machine, and/or combinations of each to perform a function(s) or an action(s), and/or to cause a function or action from another logic, method, and/or system. Logic may include, for example, a software controlled microprocessor, an ASIC, an analog circuit, a digital circuit, a programmed logic device, and a memory device containing instructions.

The web applications may be stored on any computer readable medium. A computer readable medium may include, but are not limited to, a floppy disk, a hard disk, an application specific integrated circuit (ASIC), a compact disk CD, other optical medium, a random access memory (RAM), a read only memory (ROM), a memory chip or card, a memory stick, and other media from which a computer, a processor or other electronic device can read.

The controller 13 may comprise a general processor, digital signal processor, application specific integrated circuit, field programmable gate array, analog circuit, digital circuit, combinations thereof, or other now known or later developed processor. The controller 13 may be a single device or combinations of devices, such as associated with a network or distributed processing. Any of various processing strategies may be used, such as multi-processing, multi-tasking, parallel processing, remote processing, centralized processing or the like. The controller 13 may be responsive to or operable to execute instructions stored as part of software, hardware, integrated circuits, firmware, micro-code or the like. The functions, acts, methods or tasks illustrated in the figures or described herein may be performed by the controller 13 executing instructions stored in the memory 11. The functions, acts, methods or tasks are independent of the particular type of instructions set, storage media, processor or processing strategy and may be performed by software, hardware, integrated circuits, firmware, micro-code and the like, operating alone or in combination. The instructions are for implementing the processes, techniques, methods, or acts described herein.

The I/O interface 15 may include any operable connection. An operable connection may be one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, software). Logical and/or physical communication channels may be used to create an operable connection. For example, the I/O interface 15 may comprise a first communication interface devoted to sending data, packets, or datagrams and a second communication interface devoted to receiving data, packets, or datagrams. Alternatively, the I/O interface 15 may be implemented using a single communication interface.

One specific application of DWRP is the management of a software upgrade. The administrative burden of implementing the software upgrade is lessened using DWRP. When an upgrade becomes available, director network device 10, through communication over a network, dynamically extends the functionality of the agent network devices 201 as required from one upgrade release to another upgrade release. The director network device 10 provisions the agents network devices 201 with new functionality in order to facilitate upgrade scenarios. As discussed above, the functionality is implemented by extending the work API 27 and delivering dynamic language code using HTTP requests. The dynamic language code includes the routines, data structures, object classes or protocols that the agent network devices 201 will need to communicate with the director network device 10 in performing the upgrade.

Subsequently, the director network device 10 orchestrates the upgrade across the agent network devices 201, which may include different product components or product families. Some of the agent network devices 201 may require implementation of the upgrade before the upgrade can be successfully implemented in other agent network devices 201. As discussed above, the director network device 10 may send HTTP requests to the agent network device 201 that initiate the agent executing the dynamic language code using the provisioned work API 27. The director network device 10 may also provide real-time upgrade feedback via an interactive Web 2.0 style or other administrative user interface.

Further, the director network device 10 may orchestrate complex upgrade scenarios using a workflow script. The workflow script orchestrates the upgrade by controlling tasks in a predetermined execution order, which prevents upgrade deadlocks. An upgrade deadlock occurs when one component or process depends on another component or process and vice versa. For example, an upgrade deadlock occurs in the situation when a first component upgrade is put on hold pending a second component upgrade and the second component upgrade is put on hold pending the first component upgrade. The director network device 10 prevents this problem from a higher level by identifying any potential upgrade deadlocks without involving users of the system.

Figure 3:
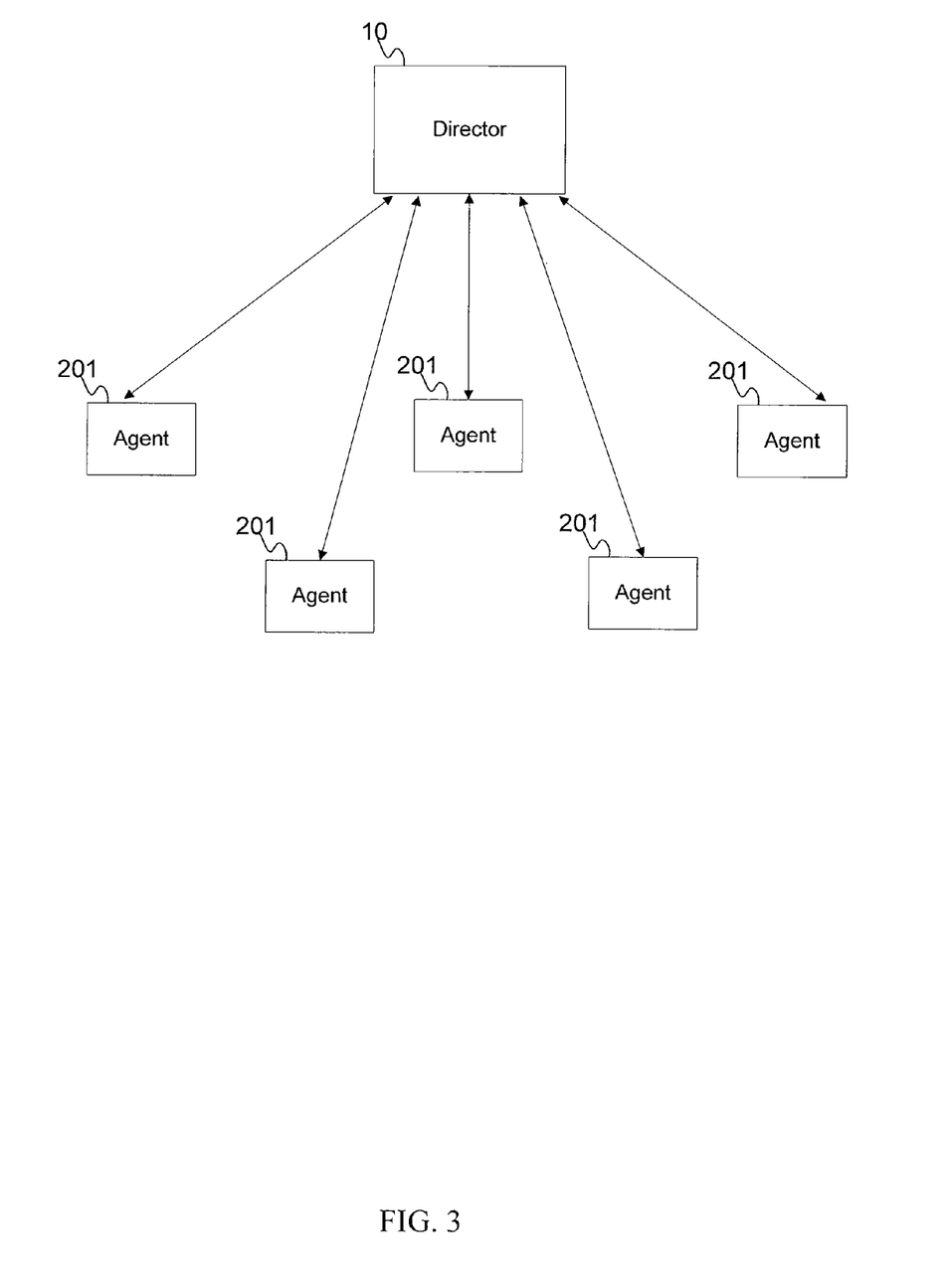
FIG. 3 illustrates one embodiment of a network including a director network device and a plurality of agent network devices.

FIG. 3 illustrates one embodiment of a network including the director network device 10 and a plurality of agent network devices 201. Communication paths indicated by arrows couple the director network device 10 with the agent network devices 201. As used herein, the phrases "in communication with" and "coupled with" are defined to mean directly connected to or indirectly connected through one or more intermediate components.

The director network device 10 may be a web application portal from which distributed upgrade orchestration may be triggered, scheduled, and monitored. The director network device 10 provisions the agent network devices 201 to extend the work API 27 within agent network devices 201. During provisioning, the agent network devices 201 receive data on what and how the tasks will be executed. For example, the director network device 10 delivers specific instructions to the agent network devices 201. The instructions include the web resources and the dynamic language code to execute when the director network device 10 engages the agent network devices 201.

Specifically, the agent network devices 201 are delivered instructions for what components will be upgraded and what procedures will be followed when the director network device 10 later orchestrates the upgrade. The agent network devices 201 may be servers or routers running a web service application. As the web service requests reach the agent network devices 201, the web service requests securely provision the agent network devices 201 with the functionality required to perform the upgrade. The director network device 10 instructs the agent network devices 201 to perform the component upgrade.

The director network device 10 may receive status information back from the agent network devices 201 at the I/O interface 15. Status information may include the success or failure of the various workflows, a completion bar, or errors. The director network device 10 may present the status information to the user by way of the display 17. The status information may be continuously, periodically, or upon request transmitted to the director network device 10 during a part or all of the commencing upgrade. The director network device 10 may provide the user with a graphical representation, including a centralized status view of the upgrade across the agent network devices 201 as the upgrade occurs.

Figure 4:
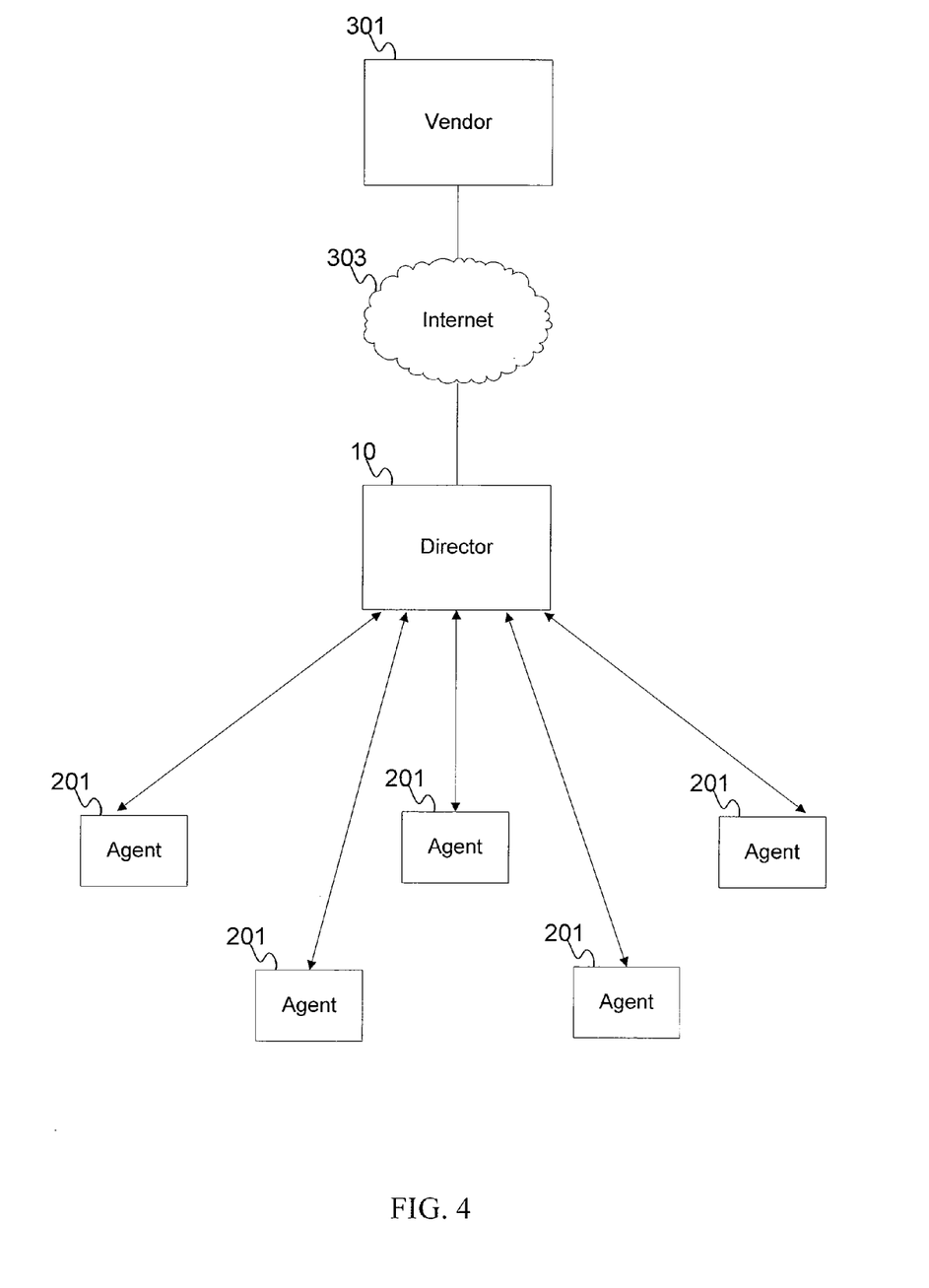
FIG. 4 illustrates one embodiment of the network of FIG. 3 and a vendor device.

FIG. 4 illustrates one implementation of the network of FIG. 3 in communication with a vendor device 301. The vendor device 301 may be a server or computer, including a memory, a controller, and a communication device similar to that discussed above. One or more developers may use the vendor device 301 to post an upgrade package to the Internet 303, for example at the vendor's website. The director network device 10 receives an alert regarding the existence of the upgrade package. The alert may be in the form of an email or a message.

Figure 5:
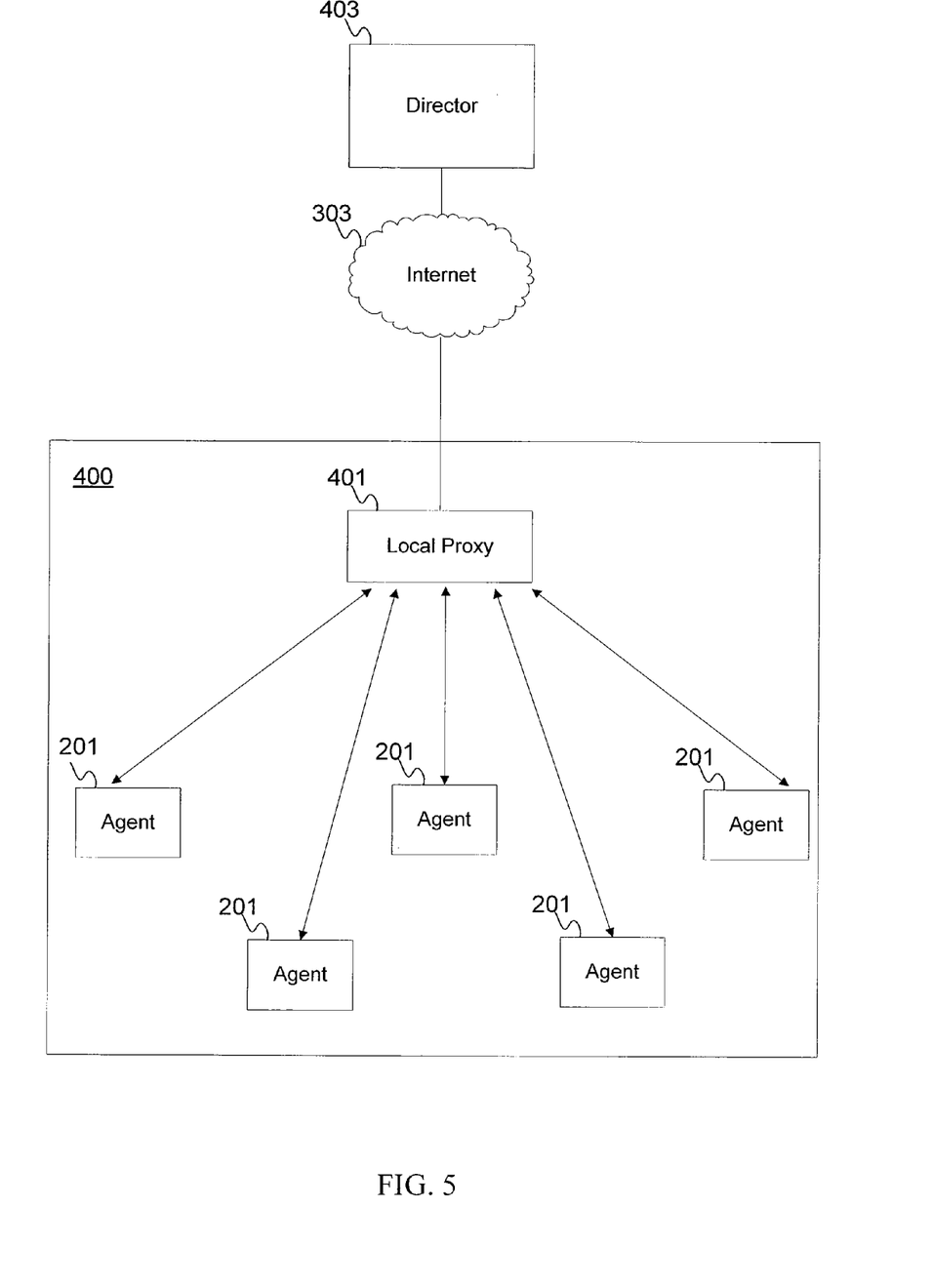
FIG. 5 illustrates one embodiment of the network of FIG. 3 with a remote director network device and a local proxy.

FIG. 5 illustrates one embodiment of a network with a remote director network device 403 and a network 400 including local proxy 401 and the agent network devices 201. The remote director network device 403 is similar to the director network device 10 except that remote director network device 403 is not located on the same network. The remote director network device 403 may be located anywhere and may be in communication with agent network devices 201 via the Internet 303 and the local proxy 401.

Figure 6:
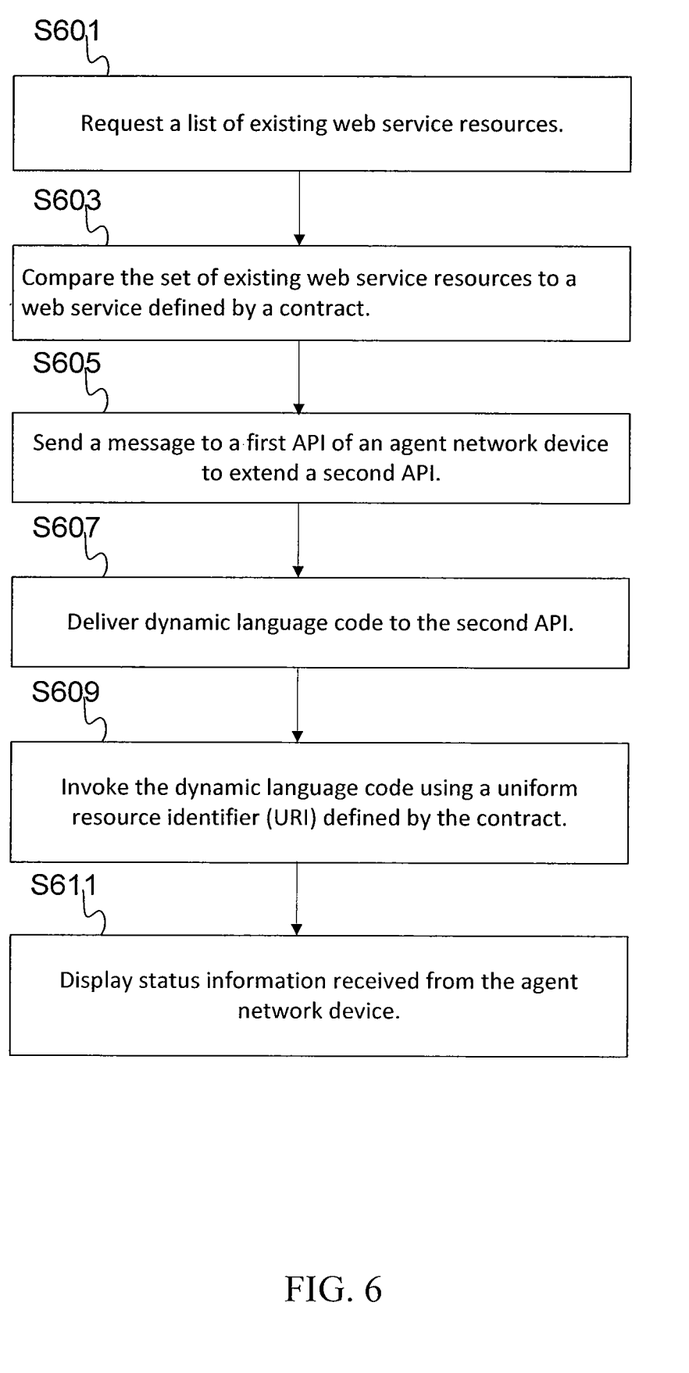
FIG. 6 illustrates a flow chart of the process of dynamic web resource provisioning.

FIG. 6 illustrates a flow chart of the process of dynamic web resource provisioning. At block S601, the director network device 10 requests a list of existing web service resources from the agent network device. At S603, the list of existing web service resources is compared to a web service defined by a contract. At S605, the director network device 10 sends a message to a first API of an agent network device 201. The message includes instructions configured to extend a second API in the at least one agent network device. At block S607, the director network device 10 delivers dynamic language code to the second API. At block S609, the director network device 10 invokes the newly provisioned work API 27 of at least one agent network device 201 thereby initiating execution of the dynamic language code according to a contract with the at least one agent network device 201. At S611, the director displays status information regarding the executing of the dynamic language code and the contract received from the at least one agent network device 201. Additional or fewer steps may be provided.

Dynamic web resource provisioning (DWRP) dynamically extends web resources to agent network device on the fly. Functionality may be added to agent network devices without any down time. The web resources may define any type of functionality. In one scenario, DWRP streamlines the upgrade experience for software. A new URI, using for example, REST web services, maps to the dynamic language code and the associated HTTP request methods and responses. The simplicity of RESTful web services over HTTP may simplify the security and scalability requirements of DWRP.

To the extent that the phrase "one or more of, A, B, and C" is employed herein, the phrase is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

Various embodiments described herein can be used alone or in combination with one another. The foregoing detailed description has described only a few of the many possible implementations of the present invention. For this reason, this detailed description is intended by way of illustration, and not by way of limitation.

I claim:

1. A method comprising:
 sending, by a director network device, a message to a first application programming interface (API) of at least one agent network device, wherein the first API includes a provisioning API configured to provision the message to a second API, wherein the message includes instructions configured to enable the second API in the at least one agent network device to extend itself, and wherein the self-extension of the second API includes adding web services functions; and
 delivering, by the director network device, dynamic language code to the second API via the provisioning API, wherein the dynamic language code defines a contract between the director network device and the at least one agent network device using the added web services functions, wherein the at least one agent network device includes a first agent network device and a second agent network device, and wherein the contract defines parameters and error handling in a first web service application in the first agent network device and a second web service application in the second agent network device.

2. The method of claim 1, further comprising:
 requesting a list of existing web service resources in the at least one agent network device before sending the message; and
 comparing the web service application to be provisioned to the list of existing web service resources.

3. The method of claim 1, further comprising: invoking the dynamic language code using a uniform resource identifier (URI) defined by the contract.

4. The method of claim 1, wherein delivering dynamic language code to the second API comprises a PUT request.

5. The method of claim 1, wherein sending a message to the first API comprises a POST request.

6. The method of claim 1, further comprising: receiving status information from the at least one agent network device; and displaying the status information.

7. The method of claim 1, further comprising: scheduling an upgrade on the first agent network device and the second agent network device, wherein execution of the dynamic language code installs the upgrade on the first agent network device and the second agent network device.

8. The method of claim 1, wherein the first web service application and the second web service application are the same web service application.

9. A non-transitory tangible storage media, included in a director network device, comprising stored instructions for execution by a processor and when executed, configured to:
 send a message to a first application programming interface (API) of at least two agent network devices, wherein the first API includes a provisioning API configured to provision the message to a second API, wherein the message includes instructions configured to enable the second API in the at least two agent network devices to extend itself, wherein the self-extension of the second API includes adding web services functions; and
 deliver dynamic language code to the second API via the provisioning API, wherein the dynamic language code defines a contract with the at least two agent network devices using the added web services functions, and wherein the contract defines parameters and error handling for a web service application in the at least two agent network devices.

10. The non-transitory tangible storage media of claim 9, further operable to:
 request a list of installed web service applications in the at least two agent network devices before sending the message; and
 compare the web service application to the list of installed web service applications.

11. The non-transitory tangible storage media of claim 9, wherein the contract defines a web service application and uniform resource identifier (URI) for invoking the dynamic language code.

12. The non-transitory tangible storage media of claim 9, further comprising:
 receive status information from the at least two agent network devices; and
 display the status information.

13. The non-transitory tangible storage media of claim 9, further operable to: schedule an upgrade on the at least two agent network devices, wherein execution of the dynamic language code installs the upgrade on the at least two agent network devices.

14. The non-transitory tangible storage media of claim 9, further operable to:
 receive status information from the at least two agent network devices; and display the status information.

15. An apparatus comprising:
 a first application programming interface (API), stored in a memory device, that includes a provisioning API configured to receive a message from a first network device and provision the message to a second API;
 the second API, stored in the memory device, configured to extend itself by instructions in the message provisioned by the provisioning API and configured to receive dynamic language code from the first network device via the provisioning API; and an execution engine, stored in the memory device, configured to execute the dynamic language code received from the first network device according to the self-extended second API and a contract between the first network device and the apparatus defined by the dynamic language code, wherein the contract defines parameters and error handling in a first web service application in the first network device and a second web service application in a second network device.

16. The apparatus of claim 15, wherein receiving code at the second API comprises a PUT request.

17. The apparatus of claim 15, wherein receiving a message at the first API comprises a POST request.

18. The apparatus of claim 15, wherein the contract defines a uniform resource identifier (URI) for invoking the dynamic language code.

19. The apparatus of claim 15, wherein the first web service application and the second web service application are the same web service application.

\* \* \* \* \*